United States Patent
Baeuerle

(10) Patent No.: US 12,044,262 B2
(45) Date of Patent: Jul. 23, 2024

(54) SPRING-LOADED LOCKING BOLT

(71) Applicant: Otto Ganter GmbH & Co. KG Normteilefabrik, Furtwangen (DE)

(72) Inventor: Martin Baeuerle, Schoenwald (DE)

(73) Assignee: OTTO GANTER GMBH & CO. KG NORMTEILEFABRIK, Furtwangen (DE)

( * ) Notice: Subject to any disclaimer, the term of this patent is extended or adjusted under 35 U.S.C. 154(b) by 305 days.

(21) Appl. No.: 17/547,524

(22) Filed: Dec. 10, 2021

(65) Prior Publication Data
US 2022/0186766 A1 Jun. 16, 2022

(30) Foreign Application Priority Data
Dec. 10, 2020 (DE) ...................... 10 2020 132 928.8

(51) Int. Cl.
*F16B 21/00* (2006.01)
*F16B 21/18* (2006.01)

(52) U.S. Cl.
CPC ................................ *F16B 21/183* (2013.01)

(58) Field of Classification Search
CPC ...... F16B 21/183; F16B 12/12; F16B 19/109; F16B 19/02
USPC .................... 411/347, 57, 163, 164; 292/128
See application file for complete search history.

(56) References Cited

U.S. PATENT DOCUMENTS

| | | | | | |
|---|---|---|---|---|---|
| 1,376,122 | A | * | 4/1921 | Songey | E05B 65/0864 292/57 |
| 4,165,854 | A | * | 8/1979 | Duly | A47C 3/34 403/324 |
| 5,586,852 | A | * | 12/1996 | Ganter | F16B 21/12 411/353 |
| 6,746,058 | B2 | * | 6/2004 | Kienzler | F16B 19/109 411/347 |
| 7,198,306 | B2 | * | 4/2007 | Ambs | F16B 5/02 411/407 |

(Continued)

FOREIGN PATENT DOCUMENTS

DE 29519311 U1 3/1996
DE 10338621 A1 3/2005
(Continued)

*Primary Examiner* — Gary W Estremsky
(74) *Attorney, Agent, or Firm* — Browdy and Neimark, PLLC

(57) ABSTRACT

A spring-loaded locking bolt with a guide sleeve and an adjusting pin movably mounted axially in the guide sleeve. The adjusting pin can be brought into a locked position protruding axially out of the guide sleeve against the actuating force of an axial compression spring and a retracted neutral position which does not protrude axially from the guide sleeve. The adjusting pin has a locking end and an actuating end in conjunction with an actuator knob. The actuator knob has an outer sleeve with which the actuator knob is movably mounted axially on a sleeve section of the guide sleeve. The actuator knob includes an inner locking projection which in the locked position lockingly engages into a corresponding recess in the side wall of the sleeve section, and fixes the actuator knob, which is engaged under spring tension, against an axial rotation about the center axis of the locking bolt, and in the neutral position the actuator knob is rotatable about the center axis.

11 Claims, 11 Drawing Sheets

(56) References Cited

U.S. PATENT DOCUMENTS

| | | | | |
|---|---|---|---|---|
| 8,702,046 | B2* | 4/2014 | Cooper | B60R 11/02 |
| | | | | 248/408 |
| 9,091,293 | B1* | 7/2015 | Tseng | F16B 21/12 |
| 2002/0159860 | A1* | 10/2002 | Kienzler | F16B 19/109 |
| | | | | 411/352 |
| 2004/0082586 | A1* | 4/2004 | Plant | C07D 405/14 |
| | | | | 546/276.4 |
| 2007/0003361 | A1* | 1/2007 | Wang | F16B 7/105 |
| | | | | 403/109.3 |
| 2007/0003365 | A1* | 1/2007 | Walt, II | E05B 65/0864 |
| | | | | 403/362 |
| 2012/0055302 | A1 | 3/2012 | Tanaka et al. | |
| 2012/0301244 | A1* | 11/2012 | Chiu | F16B 21/02 |
| | | | | 411/166 |
| 2020/0040928 | A1* | 2/2020 | Ganter | F16B 19/109 |

FOREIGN PATENT DOCUMENTS

| | | | |
|---|---|---|---|
| DE | 102012112610 | A1 | 6/2014 |
| DE | 202015003789 | U1 | 7/2015 |
| EP | 1 236 910 | A2 | 9/2002 |
| EP | 2 163 772 | A1 | 3/2010 |
| EP | 3 499 055 | A1 | 6/2019 |
| EP | 3 605 268 | A1 | 2/2022 |

\* cited by examiner

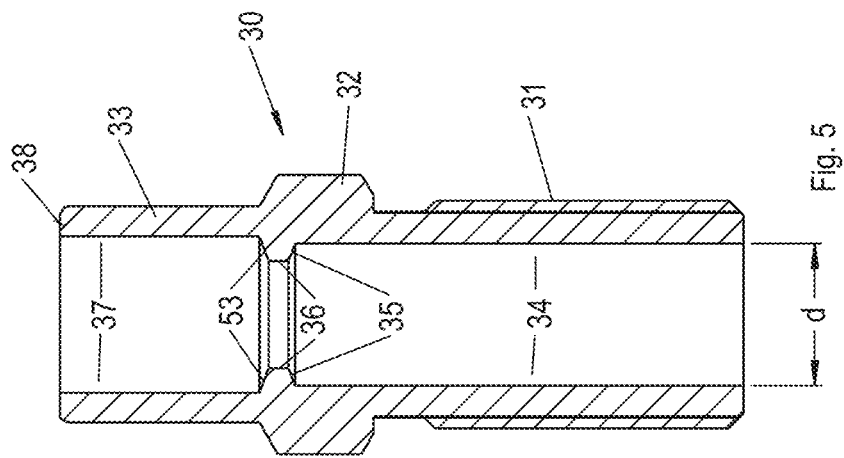
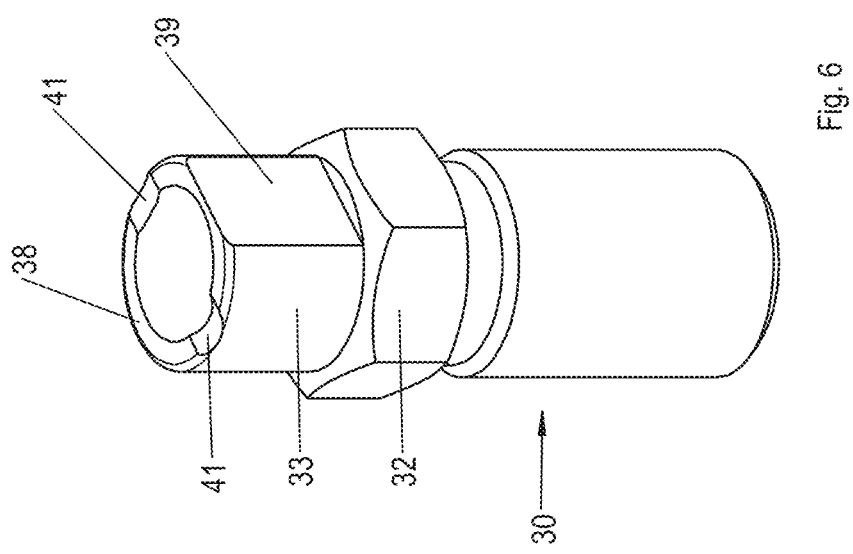
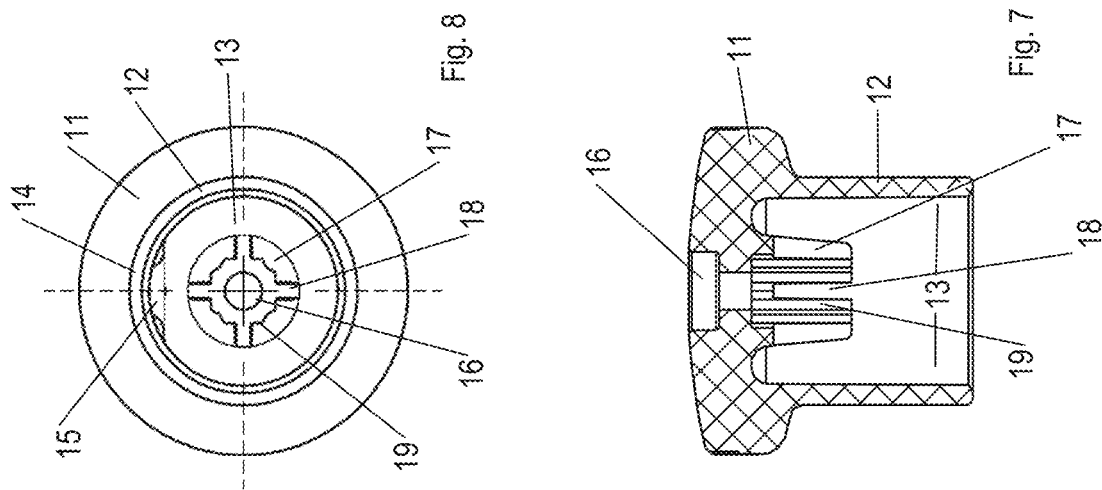

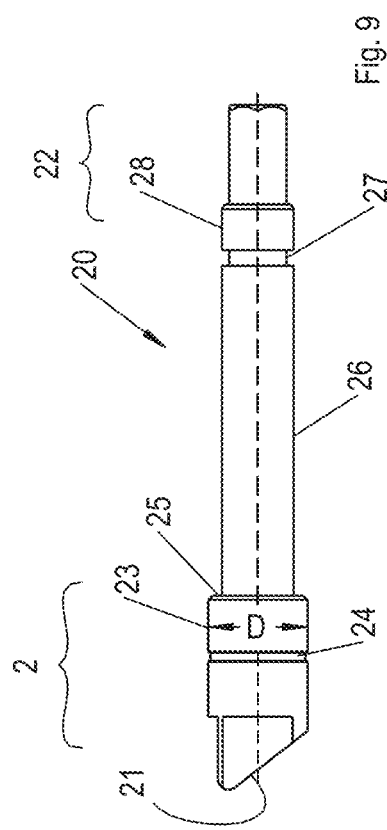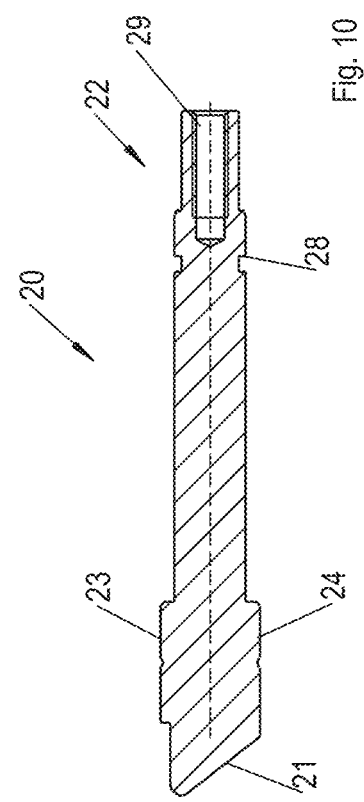

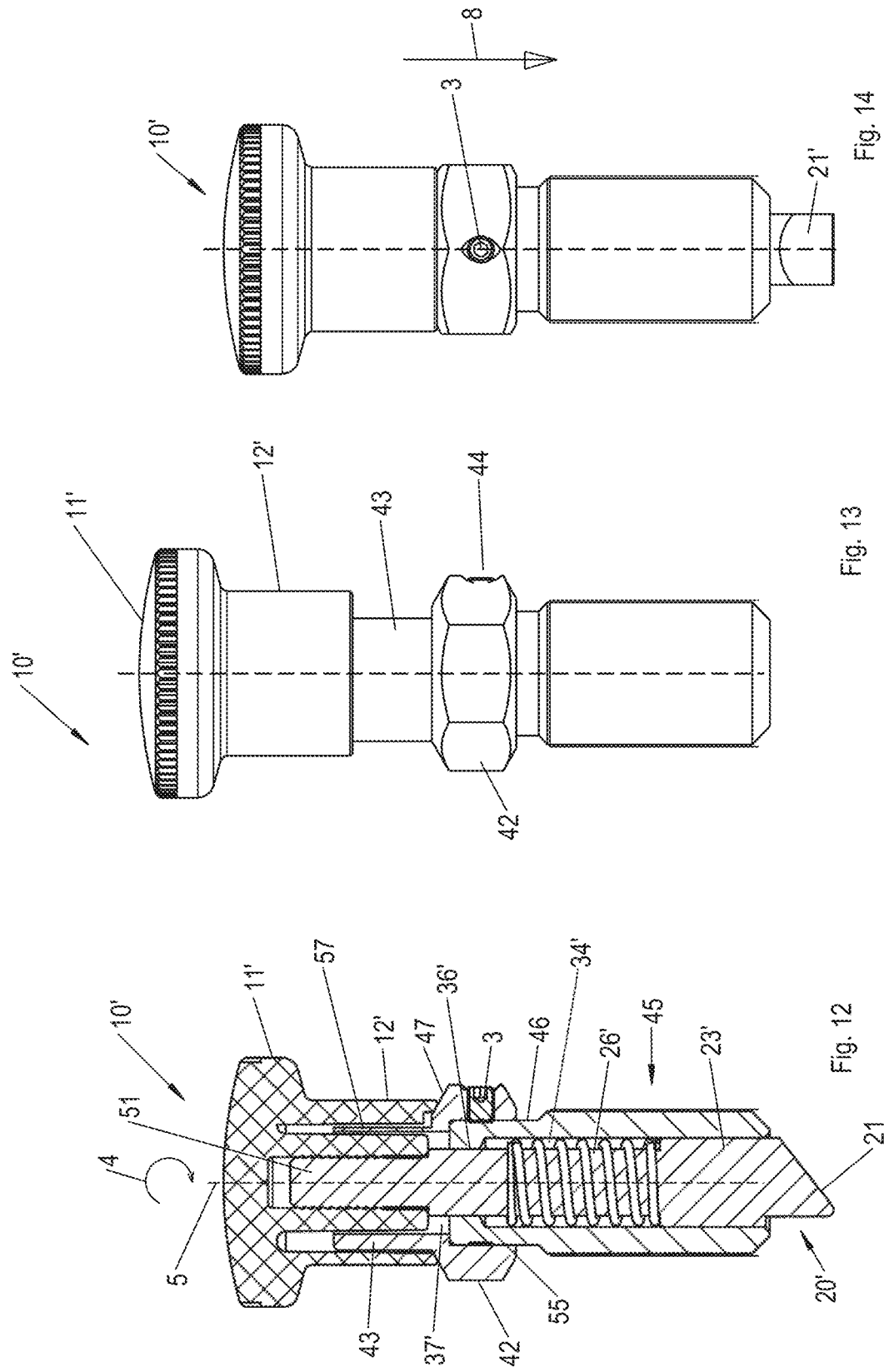

SPRING-LOADED LOCKING BOLT

FIELD

The object of the invention is a spring-loaded locking bolt having a guide sleeve which is screwed into an associated bore in a machine or furniture part, and an adjusting pin which is movably mounted axially in the guide sleeve and which can be brought into at least two locking positions in the guide sleeve, which can be adjusted from a locked position protruding axially out of the guide sleeve against the actuating force of an axial compression spring into a retracted neutral position which does not protrude axially from the guide sleeve, and which has a tip-side locking end and an oppositely arranged actuating end in connection with an actuator knob, wherein the actuator knob has an outer sleeve with which the actuator knob is movably mounted axially on a sleeve section of the guide sleeve.

BACKGROUND

Such a locking bolt is disclosed, for example, in DE 10 2012 112 610 A1 and consists of a guide sleeve and an adjusting pin mounted in the guide sleeve and having a locking end and an actuating end, wherein the adjusting pin is movably mounted axially between a first axial end position and a second axial end position within the guide sleeve.

At least in one axial end position, the adjusting pin can thereby be temporarily or permanently fixed relative to the guide sleeve by a locking mechanism or by magnetic elements.

Furthermore, the locking bolt can have an automatic reset and can thereby assume an initial position.

Whether the locking bolt is moved for actuation or for locking or for unlocking by pushing or pulling the actuating element, for example, an actuator knob, depends on the place of installation and the operating principle of the reset element, for example, a compression or tension spring. Preferably, an axial compression spring is provided which compresses the adjusting pin of the locking bolt into an axial end position.

DE 295 19 311 U1 shows a spring-loaded locking bolt with a guide sleeve which is screwed into an associated bore in a machine or furniture part and an adjusting pin movably mounted axially in the guide sleeve. The adjusting pin can be adjusted from a locked position, which protrudes axially from the guide sleeve against the actuating force of an axial compression spring, into a retracted neutral position which does not protrude axially from the guide sleeve. The adjusting pin also has a locking end and an actuating end connected with an actuator knob. The actuator knob has an inner sleeve with which, depending on position, the actuator knob is mounted on a sleeve section of the guide sleeve. This inner sleeve has a recessed hexagonal profile into which the guide sleeve, which has an external hexagonal profile, can retract when the actuator knob is rotated by 30° in the pulled neutral position.

Only after the actuator knob is pulled once again is the guide sleeve disengaged from the inner sleeve and the actuator knob can be turned until the two hexagonal profiles are aligned, and the adjusting pin can be brought in the axial direction into the locked position.

The disadvantage of this is, however, that it is never possible to precisely determine the location of the adjusting pin, which can be rotated about its longitudinal axis. This is, however, necessary when using an adjusting pin with a beveled approach edge at the free end of the adjusting pin, since the alignment of the beveled approach edge influences the fixation of a component in the cavity of which the tip of the adjusting pin can be engaged, or which is engaged from behind by the tip. An automatic engagement and/or disengagement can thereby be enabled in selected directions, whereas other directions in which the component and adjusting pin move relative to each other are blocked. Such an operation is not possible with this prior art because a direction-dependent setting of the beveled approach edge of the adjusting pin is lacking.

SUMMARY

The invention is therefore based on the task of further developing a locking bolt of the type mentioned above in such a way that, taking into account a simplified embodiment, a specific alignment of the beveled approach edge is possible so that the locking bolt can be operated without error.

The task is solved according to the invention by the features of the independent patent claim, whereas advantageous embodiments and further developments of the invention can be taken from the sub-claims.

An advantageous feature is that the actuator knob comprises at least one internal locking projection, which, in the locked position, engages in a locking manner in a corresponding recess in the side wall of the sleeve section of the guide sleeve and fixes against rotation the actuator knob, which is engaged under spring tension, with respect to an axial rotation about the center axis of the locking bolt, and in which, in the neutral position, the fixed position of the locking projection which is blocked against rotation is cancelled and the actuator knob is rotatable about the center axis.

The locking projection is arranged on the inner circumference of the sleeve and extends in a radial and axial direction.

This invention is, however, not limited to this embodiment of the locking projection. Geometries that differ from a locking projection, such as, for example, a locking stop that engages in a lateral locking groove in the side wall of the sleeve section, are also claimed by this invention. Curved or angular locking projections are also, for example, claimed. The shaping of the recess is always complementary to the shaping of the locking projection.

In an advantageous embodiment, the locking projection is no longer in engagement with the recess in the neutral position and when the actuator knob is rotated and is seated on the end face of the sleeve section of the guide sleeve due to the operative spring tension, and can be brought into at least two different locking positions of the guide sleeve. In so doing, a locking catch can be created which serves to fix the actuator knob in a certain rotated end position. Changes in the position of the adjusting pin in the axial direction are also not possible due to the support on the end face.

A downwardly open receiving space on the inside of the actuator knob is used to receive the sleeve section of the guide sleeve when the locking bolt is moved to the locked position.

The actuator knob position, in which the projection rests on the end face of the sleeve section, can only be reached by rotating the actuator knob when it is pulled into the neutral position.

In a particularly advantageous further development of this embodiment, the end face of the sleeve section has at least one locking groove for receiving the locking projection. Preferably, there are two locking grooves into which the locking projection can enter when the actuator knob is rotated. When mounted in this manner, the locking bolt can remain temporarily or permanently in the end position that has been reached.

Further rotation or release of the locking projection from a locking groove can only be achieved by applying force in the direction of rotation about the center axis and/or by pulling the actuator knob.

If the locking projection is turned until it reaches the recess in the wall of the sleeve section, the locking projection is no longer in contact with the end face of the sleeve section and the actuator knob no longer has a hold on the end face. The locking projection is now accommodated in the free space formed by the recess and, due to the reset force of the axial compression spring, moves from the neutral position along the sleeve section until the complete locking position is reached. The actuator knob, in which the locking projection is located, also moves back towards the external hexagonal profile through the movement.

In a further development of this embodiment, the end surface of the knob-side sleeve comes to rest on the upper side of the external hexagonal profile during this movement, this to block a further movement in the axial direction. The support on the upper side of the external hexagonal profile thereby forms the end position of the axial movement, wherein the adjusting pin protrudes to its maximum from the guide sleeve.

In another advantageous further development, the adjusting pin has a locking pin at the locking end, at the end of which locking pin there is a beveled approach edge, as well as a guide section which adjoins the locking pin in the direction of the actuating end, which is radially reduced in diameter, which guide section is surrounded at least in sections by the axial compression spring and opens into the actuating end, which can be brought into axially fixed engagement with the actuator knob.

A preferred further development of the locking bolt is characterized in that the guide sleeve has an axial guide bore through which the adjusting pin is guided and which is open in the direction of the locking end and has a bore section in the direction of the actuating end which narrows the guide bore radially, and in that the guide bore above the bore section once again widens radially and forms an interior space within the sleeve section which is open in the direction of the actuating end.

The axial compression spring is clamped between a ring shoulder of the locking pin, which ring shoulder is radially larger than the guide section, and an end stop at the beginning of the bore section of the guide sleeve.

In a preferred further development, the actuator knob has an inner mounting sleeve which is radially spaced away from the outer sleeve, and which extends in the axial direction, within which the actuating end of the adjusting pin is at least partially accommodated.

In a particularly advantageous further development of this embodiment, the actuating end of the adjusting pin has a profile to provide a rotationally fixed and frictional connection to the mounting sleeve.

In a particularly advantageous further development, the mounting sleeve has an inner profile corresponding to the outer profile of the actuating end.

In a further advantageous further development of this embodiment, the side wall of the mounting sleeve has slots running in the axial direction, which can be expanded elastically to ensure that the actuating end is firmly accommodated inside the mounting sleeve.

In a preferred further development, the mounting sleeve is adjoined by a feed-through extending through the head of the actuator knob, through which a screw is guided that engages in a thread introduced in the longitudinal direction of the actuating end for axial adjustment of the spring-preloaded adjusting pin.

This allows an adjustment of the axial position of the retention pin in the maximum disengaged position, while maintaining the rotational alignment of the tip, relative to the guide sleeve. If the screw is actuated in a clockwise direction, it screws deeper into the thread at the actuating end. Since the screw head is secured against axial movement in the feedthrough position, the thread engagement causes a pulling movement and the adjusting pin is moved in the direction of the actuator head. The locking end is thus pulled into the guide sleeve.

If the screw is actuated counterclockwise, the adjusting pin is moved away from the actuator knob and the locking end moves further out of the downwardly open guide sleeve.

In a preferred further development of a locking bolt, the bore section, which is radially reduced relative to the guide bore, forms a further end stop in the direction of the actuating end, on which rests a circlip, that is at least partially inserted in a circlip groove of the guide section of the locking pin, when the thread is decoupled from the screw and the adjusting pin is moved axially.

In an alternative design of the locking bolt according to the invention, the guide sleeve is at least divided into two parts and comprises a plug-in sleeve and a rotatable receiving sleeve which can be plugged onto the plug-in sleeve.

In a particularly advantageous further development of this embodiment, the plug-in sleeve has a ring groove in which a grub screw protruding inward from the receiving sleeve engages to secure the two sleeves against each other.

If the grub screw is loosened, the receiving sleeve can be rotated relative to the plug-in sleeve. Since the receiving sleeve, as in the first embodiment, has a recess for receiving and guiding the locking tooth of the actuator knob, the rotational position in which the actuating sleeve engages with the locking tooth in the recess can also be changed by rotating the receiving sleeve. Since the actuating sleeve is rotationally fixed to the adjusting pin in the second embodiment, the orientation of the beveled approach edge present at the end of the adjusting pin can thus also be adjusted.

In this manner, the alignment of the beveled approach edge can be adjusted by a loosening of the grub screw and twisting of the receiving sleeve without pulling on or disassembling the locking bolt. Alignment of the beveled approach edge is thereby possible in the locked position of the locking bolt, which is to say when the adjusting pin protrudes completely from the guide sleeve.

Other forms of an anti-rotation device as a securing element are also claimed by this invention, such as, for example, an adjusting ring, a locking ring, a locking washer, cotter pins or axle retainers, which serve to secure the components against axial displacement or rotation. This securing can be effected by positive locking or frictional locking.

The subject-matter of this invention results not only from the subject-matter of the individual patent claims, but also from the combination of the individual patent claims with each other.

All details and features disclosed in the documents, including the abstract, in particular the spatial configuration shown in the drawings, are claimed to be essential to the invention insofar as, whether on their own or in combination, they are new when compared to prior art.

Insofar as individual items are designated as "essential to the invention" or "important", this does not mean that these items must necessarily form the subject-matter of an independent claim. This is determined solely by the applicable wording of the independent patent claim.

BRIEF DESCRIPTION OF THE DRAWINGS

In the following, the novelty is explained in more detail with reference to drawings illustrating several embodiments. Here, further features and advantages of the innovation essential to the invention emerge from the drawings and their description.

FIG. 5: shows a cross-section of the guide sleeve;

FIG. 6: shows a perspective view of the guide sleeve;

FIG. 7: shows a cross-section of the actuator knob;

FIG. 8: shows a bottom view of the actuator knob;

FIG. 9: shows a side view of the adjusting pin;

FIG. 10: shows a cross-section of the adjusting pin shown in FIG. 9;

FIG. 12: shows a cross-sectional view of the second embodiment of a locking bolt according to this invention;

FIG. 13: shows a side view of the second embodiment of the locking bolt illustrated in FIG. 12 in the pulled state;

FIG. 14: shows a side view of the second embodiment of a locking bolt illustrated in FIG. 12 and FIG. 13;

DETAILED DESCRIPTION

Figure 1:
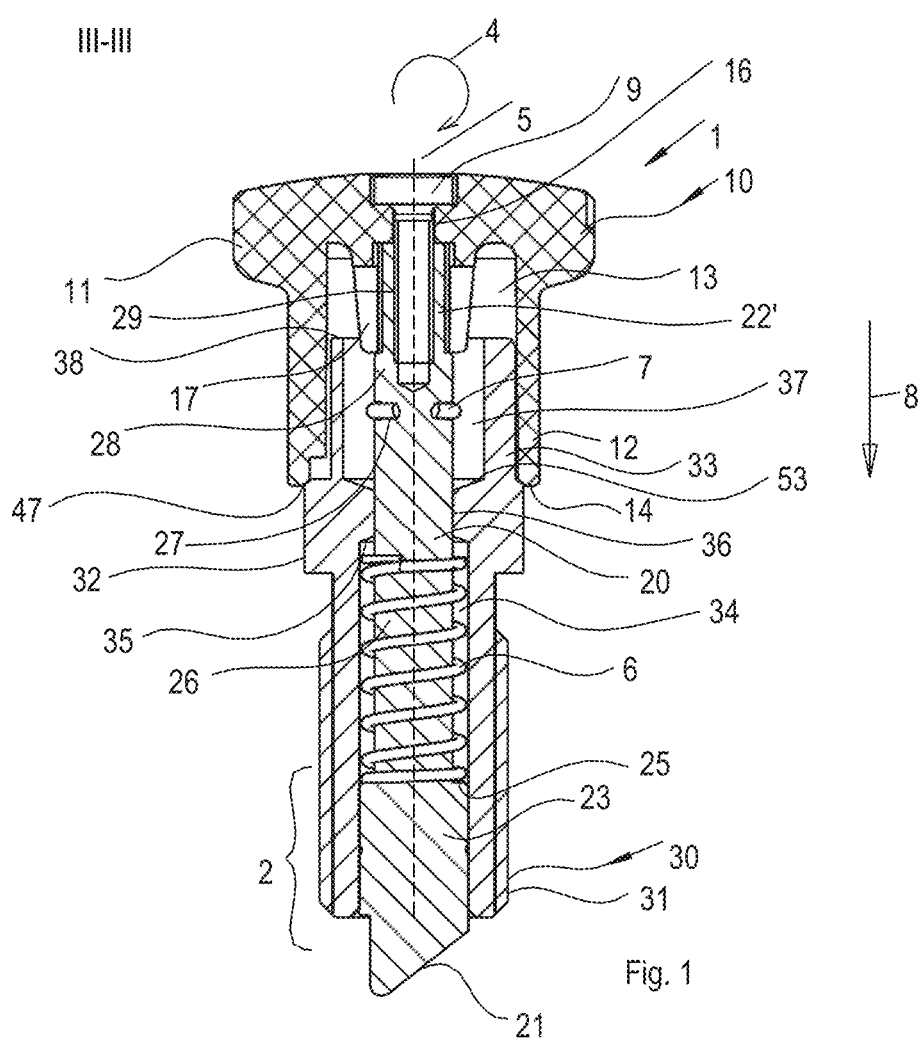
FIG. 1: shows a cross-section of a first embodiment of a locking bolt according to this invention. Cross-section I-I according to FIG. 3.

FIG. 1 shows a cross-sectional view of the individual components of a locking bolt 1 according to the invention. This locking bolt 1 consists of a guide sleeve 30, which is shown in vertical section in FIG. 1. The guide sleeve 30 has an external thread 31 in its lower actuating end, with which the guide sleeve 30 can be screwed into a machine component or the like. Instead of an external thread, this actuating end of the guide sleeve 30 can also be provided with another fastening means known from prior art, such as a screw-on plate, a weld-on plate or the like. A lock nut can be screwed onto this external thread 31 which is not shown in FIG. 1.

Figure 4:
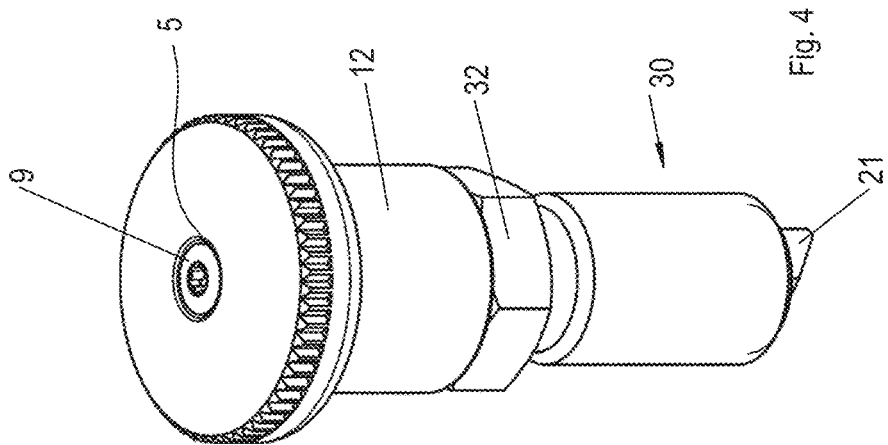
FIG. 4: shows a perspective view of the first embodiment.
Figure 3:
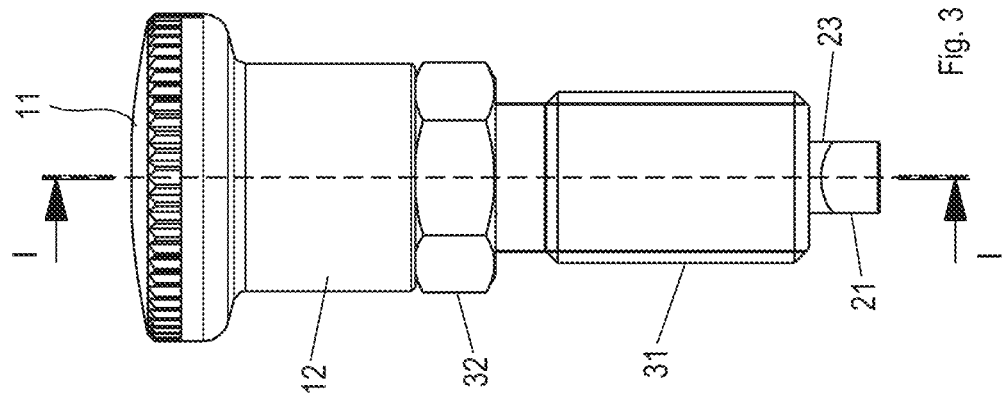
FIG. 3: shows an opposite side view of FIG. 2.
Figure 2:
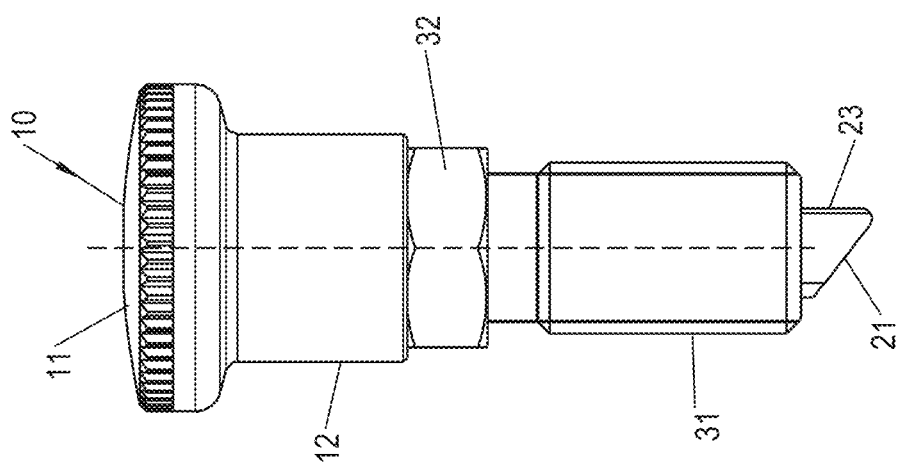
FIG. 2: shows a side view of the first embodiment illustrated in FIG. 1.

Above the external thread 31, approximately in the middle area of the guide sleeve 30, there is an external hexagonal profile 32, by means of which the guide sleeve 30 can be screwed into the machine component or the like. This external hexagonal profile can be seen, for example, in FIGS. 2 to 4.

Moving upwards, this external hexagonal profile 32 is joined by a sleeve section 33, which forms a hollow cylinder. In the approximate axial region of the external hexagonal profile 32 and the external thread 31, the guide sleeve 30 has a stepped guide bore 34, which forms a radially inwardly offset end stop 35 in the approximate region of the external hexagonal profile 32.

A radially tapered bore section 36 adjoins this stop 35 towards the sleeve section 33 and opens into a radially widened interior space 37 of the sleeve section 33.

An adjusting pin 20 is inserted through the interior space 37, the bore section 36, and the guide bore 34, which adjusting pin 20 forms a radially expanded locking pin 23 in its lower actuating end 22, as can be seen in FIG. 1. This locking pin 23 has an outer diameter D which corresponds to the inner diameter d of the bore section 36, in particular in the axial area of the external thread 31, as can be seen in FIG. 9.

This locking pin 23 is attached at the top to a guide section 26, which is reduced in diameter and protrudes through the bore section 36, which is radially tapered relative to the guide bore 34, and extends into the radially widened interior space 37. At the end of the guide section 26, which is to say in the section opposite the locking pin 23, the adjusting pin 20 forms an actuating end 22 on which the actuator knob 10 can be mounted.

As can be seen in FIG. 9, the actuating end 22 has an external hexagonal contour with which the actuating end 22 can be brought into axially fixed engagement with the actuator knob 10.

For this purpose, the actuator knob 10 has an inner mounting sleeve 17, which forms a correspondingly diameter-adjusted inner profile 19 for receiving the actuating end 22, of which only the cross-section is visible in FIG. 1, but which can be clearly seen in FIG. 8. The diameter of this inner profile 19 is such that the actuating end 22 of the adjusting pin 20, after insertion into the mounting sleeve 17, forms both a positive locking and frictional connection, such that an axially fixed connection comes to be after the actuator knob 10 is placed on the adjusting pin 20.

The actuating end 22 of the adjusting pin 20, which is inserted into the radially tapered mounting sleeve 17, is fixed in an axially fixed position by the screw 9, which is screwed into the thread 29 of the actuating end 22.

The screw 9 is centrally inserted in the upper side of the actuator knob 10 in a feed-through 16 and is secured against axial movement in the arrow direction 8 by a circular-shaped support stop.

An axial compression spring 6 can be placed on the guide section 26 of the adjusting pin 20 and is located together with the lower locking pin 23 within the radially expanded area of the guide bore 34. By means of this axial compression spring 6, the adjusting pin 20 is held in its locking position, in which the locking pin 23 protrudes axially downward out of the guide sleeve 30 and has a beveled approach edge 21. The adjusting spring 6 is arranged under axial pretension and clamped between ring shoulder 25 and end stop 35.

Due to the locking effect of the locking projection 15 with the locking groove 41, this axial position of the adjusting pin 20 is fixed within the guide sleeve 33.

Furthermore, it can be seen from FIG. 1, FIG. 7 and FIG. 8 that the radial outer sleeve 12 and the mounting sleeve 17 are at a radial distance from each other, so that in the assembled state the upper sleeve section 33 of the guide sleeve 30 can be inserted between the sleeve 12 and the mounting sleeve 17. A receiving space 13 is thereby formed between the outer sleeve 12 and the mounting sleeve 17, as can also, in particular, be seen from the cross-sectional view of FIG. 7.

According to FIGS. 1 to 4, the locking bolt 1 is in its locked position, in which the locking pin 23 protrudes through the guide sleeve 30 and juts downwards from it.

At the same time, the end surface 14 of the sleeve of the actuator knob 10 is axially supported on the end stop 47, above the external hexagonal profile 32.

FIG. 8 shows the actuator knob 10 with the locking projection 15, which can retract and latch into the locking grooves 41 (FIG. 6). Due to the locking effect of the locking projection 15 with a locking groove 41, the rotated position of the actuator knob 10 and the axial position of the adjusting pin 20 can be fixed within the guide sleeve 30.

If the actuator knob 10 together with the adjusting pin 20 screwed to it is now pulled against the arrow direction 8, the locking projection 15 disengages from the locking groove 41 and can slide along the end face 38 of the sleeve section 33 when the actuator knob 10 is rotated in the arrow direction 4 until the locking projection reaches the area above the recess 39. At this time, the locking projection 15 is no longer in contact with the end face 38 and the actuator head 10 can once again be moved in the direction of the end stop 47 in arrow direction 8. This movement is supported by the reset force of the axial compression spring 6.

The vertical travel limitation of the adjusting pin 20 in the arrow direction 8 can be adjusted by screw 9. In order to be able to bring the actuator knob 10 back together with the adjusting pin 20 into the locked position shown in FIG. 1, the actuator knob 10 must first be turned against the arrow direction 4 relative to the guide sleeve 30 until the locking projection 15 comes back into the area of the recess 39.

FIG. 5 shows guide sleeve 30, which in this embodiment has the guide bore 34. This guide bore 34 has a radially inwardly protruding axial, circumferential end stop 35 on which, in the assembled state, the axial compression spring 6 is axially supported.

FIG. 7 shows the radial inner mounting sleeve 17, which, in the installed state, surrounds the actuating end 22 of the adjusting pin 20.

FIG. 7 moreover shows a cross-sectional view of the actuator knob 10, which is mushroom-shaped and consists of an upper head 11 and a sleeve 12 adjoining it in the axial direction. The hollow sleeve 12 encloses the receiving space 13 in which the sleeve section 33 is received.

Starting from the underside of the head 11, the mounting sleeve 17 protrudes into the receiving space 13. The mounting sleeve 17 has edge slots 18 which extend in the axial direction and allow elastic expansion of the mounting sleeve when the actuating end 22 is introduced. On the inside of the mounting sleeve 17, it has an inner profile that is adapted to the profile of the actuating end 22.

FIG. 9 shows a side view of the adjusting pin 20, which forms a radially expanded locking pin 23 in its lower locking end (left). At the end of the locking pin 23 and thus at the end of the adjusting pin, there is a tip that is not rotationally symmetrical with respect to the center axis and a not rotationally symmetrical point, which forms the beveled approach edge 21. A guide section 26, which is smaller in diameter than the locking pin, adjoins the locking pin 23 at the top right. At the end of the guide section 26, which is to say at the section opposite the locking pin 23, the adjusting pin 20 has an actuating end 22 onto which the actuator knob 10 can be mounted. This actuating end 22 has an external hexagonal contour with which the actuating end 22 can be brought into axially fixed engagement with the actuator knob 10.

The locking pin 23 has a radially outwardly open groove on its outer circumference, which forms the marking 24. When the marking 24 is visible below the guide sleeve 30, the operating personnel can see that the entire adjusting pin 20 with its locking pin 23 is in a locking position in which the locking pin 23 protrudes to a maximum from the guide sleeve 30.

At the end of the guide section 26, shortly before the beginning of the actuating end 22, the guide section 26 has a radially outwardly open circlip groove 27 on its outer circumference, which serves to receive the circlip 7. This circlip 7 can be seen in FIG. 1 and serves to limit the axial movement of the adjusting pin 20. As soon as the circlip 7 comes into contact with the end stop 53 during a movement of the adjusting pin 20 in arrow direction 8, the same prevents further movement of the adjusting pin in arrow direction 8. In this way, it is, for example, possible to prevent the adjusting pin 20, which is pressed down by the spring tension of the axial compression spring 6, from falling out of the guide sleeve 30 when the screw 9 is completely released from the thread 29. The adjusting pin is instead then held by the circlip 7 inside the guide sleeve.

FIG. 10 shows the cross-sectional view of FIG. 9, wherein the thread 29 inserted in the actuating end 22, for receiving the screw 9, can be seen.

The design according to the invention thus defines by the screw 9, on the one hand, the relative position of the locking pin 23 protruding downward from of the guide sleeve 30 in relation to the actuator knob 10 and, on the other hand, at the same time, the retracted neutral position of the actuator knob 10 and thereby that of the adjusting pin 20 in the guide sleeve 30.

Figure 11:
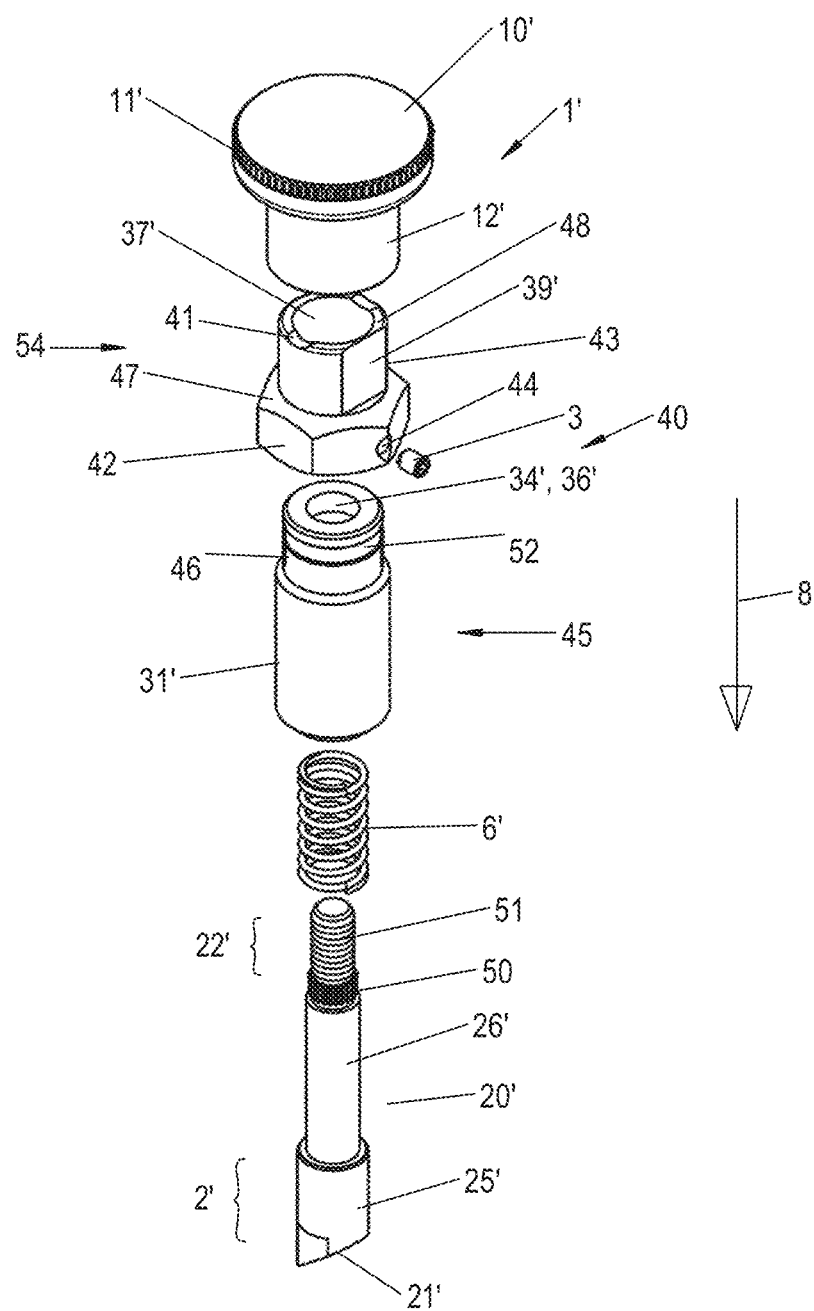
FIG. 11: shows an exploded view of a second embodiment of a locking bolt according to this invention.

FIG. 11 shows a second embodiment of the locking bolt 1' according to the invention, wherein the same parts from the first embodiment are provided with the same reference signs with the addition of "'". The plug-in sleeve 45 has a ring groove 52 in which engages a grub screw 3 protruding inwardly from the receiving sleeve 54, which positionally secures the two sleeves against each other. The grub screw 3 is screwed into the thread 44 of the receiving sleeve 54.

If the grub screw 3 is loosened, the receiving sleeve 54 can be rotated relative to the plug-in sleeve 45. Since the receiving sleeve 54, as in the first embodiment, has a recess 39' for receiving and guiding the locking tooth of the actuator knob 10', rotation of the receiving sleeve 54 can also change the rotational position at which the actuating sleeve 10' engages the recess 39' with the locking tooth. Since, in the second embodiment, the actuating sleeve 10' is connected to the adjusting pin 20' in a rotationally fixed manner, the alignment of the beveled approach edge 21' present at the end of the adjusting pin 20' can thus also be adjusted.

FIG. 12 shows a cross-sectional view of the individual components of a locking bolt 1 according to the second embodiment. This locking bolt 1 comprises the guide sleeve 40, which is shown in vertical section in FIG. 12. The guide sleeve 40 has an external thread in its lower actuating end, with which the guide sleeve can be screwed into a machine component or the like. Instead of an external thread, this actuating end of the guide sleeve 40 can also be provided with another fastening means known from prior art, such as a screw-on plate, a weld-on plate or the like. A lock nut can be screwed onto this external thread, which is not shown in FIG. 12.

Above the external thread, approximately in the middle area of the guide sleeve 40, there is an external hexagonal profile 42, by means of which the guide sleeve 40 can be screwed in a fixed position into the machine component or the like. This external hexagonal profile can also be seen in FIG. 13 and FIG. 14.

It is also possible to imagine a hexagonal profile above the thread of the guide sleeve 40, with which the guide sleeve can independently be screwed into the machine component.

Moving upwards, this external hexagonal profile 42 is joined by a sleeve section 43, which forms a hollow cylinder, in the approximate axial region of the external hexagonal profile 42 and the external thread, the guide sleeve 40 has a stepped guide bore 34', which forms a radially inwardly offset end stop 55 in approximately the region of the external hexagonal profile 42.

A radially tapered bore section 36' adjoins this end stop 55 towards the sleeve section 43 and opens into a radially widened interior space 37' of the sleeve section 43.

An adjusting pin 20' is inserted through the interior space 37', the bore section 36', and the guide bore 34', which adjusting pin 20' forms a radially expanded locking pin 23' in its lower actuating end. This locking pin 23' has an outer diameter corresponding to the inner diameter of bore section 36'.

This locking pin 23' is attached at the top to a guide section 26', which is reduced in diameter and protrudes through the bore section 36', which is radially tapered relative to the guide bore 34', and extends into the radially widened interior space 37'. At the end of the guide section 26', which is to say at the section opposite the locking pin 23', the adjusting pin 20' forms an actuating end 22' on which the actuator knob 10' can be mounted.

As can be seen in FIG. 11, this actuating end 22' has a profiled outer contour, namely a knurling 50 and a tooth-profiled area 51, with which the actuating end 22' can be brought into axially fixed engagement with the actuator knob 10'.

For this purpose, the actuator knob 10' has an inner mounting sleeve 57, which is adapted to receive the actuating end 22'. The inside of the mounting sleeve 57 is designed in such a way that the actuating end 22' of the adjusting pin 20' forms both a positive locking and a frictional connection after insertion into the mounting sleeve 57, such that an axially fixed connection is formed after the actuator knob 10' is placed on the adjusting pin 20'.

An axial compression spring 6' can be placed on the guide section 26' of the adjusting pin 20' and is located together with the lower locking pin 23' within the radially expanded area of the guide bore 34'. The adjusting pin 20' is held in its locking position by means of this axial compression spring 6', in which locking position the locking pin 23' protrudes axially downwards from the guide sleeve 40 and has a beveled approach edge 21'.

FIG. 12 also shows the guide sleeve 40, which has the guide bore 34. This guide bore 34' has a radially inwardly protruding axial, circumferential end stop 55 on which, in the assembled state, the axial compression spring 6' is axially supported.

Furthermore, it can be seen from FIG. 12 that the radial outer sleeve 12' and the mounting sleeve 57 are at a radial distance from each other, so that in the assembled state the upper sleeve section 43 of the guide sleeve 40 can be inserted between the sleeve 12' and the mounting sleeve 57. A receiving space is thereby formed between the outer sleeve 12' and the mounting sleeve 57.

According to FIG. 12, the locking bolt 1' is in its locked position, in which the locking pin 23' protrudes through the guide sleeve 40 and protrudes downward from this guide sleeve 40.

At the same time, the end surface of the sleeve 12' is axially supported on the end stop above the external hexagonal profile 42.

FIG. 13 shows the pulled position of the actuator knob 10', which is to say the neutral position of the locking bolt. If the actuator knob 10' is now pulled together with the adjusting pin 20' that is screwed to it in the direction opposite the arrow direction 8, the locking projection disengages from the recess 39' (see FIG. 11) and can slide along the inside of the end face 48 when the actuator knob is rotated in arrow direction 8, until the locking projection reaches the area of the locking groove 41 and the actuator knob 10' once again moves in arrow direction 8.

In order to now be able to move the actuator knob 10' together with the adjusting pin 20' back into the locked position shown in FIG. 14, the actuator knob 10' must first be moved in the direction opposite the arrow direction 8 relative to the guide sleeve 40 until, in particular with the locking projection, it returns to the free space provided by the recess 39.

Figure 15:
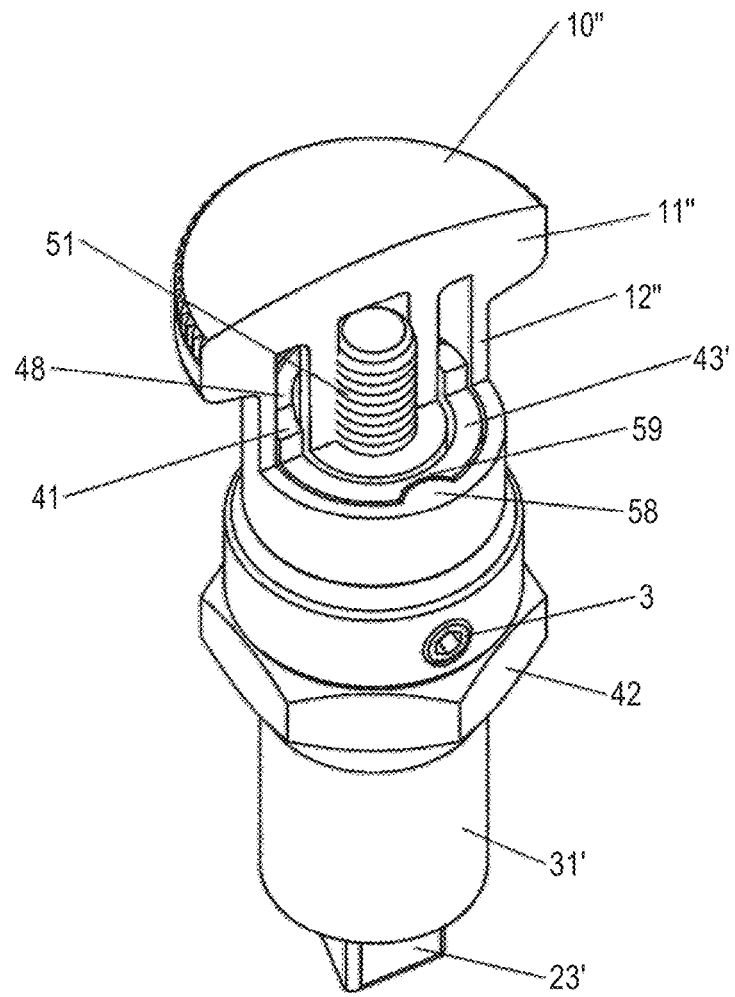
FIG. 15: shows a perspective view of a locking bolt with partially cut-away actuator head according to a third embodiment.

FIG. 15 shows a further embodiment example of the locking bolt, wherein the sleeve section 43' has an approximately semicircular and radially outwardly open recess 59 introduced in the longitudinal direction in the outer circumference. There is a locking projection 58 engaging the recess 59 and having a shape complementary to the recess 59 inside the sleeve 12". In the example according to FIG. 15, the locking projection 58 has an arcuate shape and is retracted into the associated recess 59.

Figure 16:
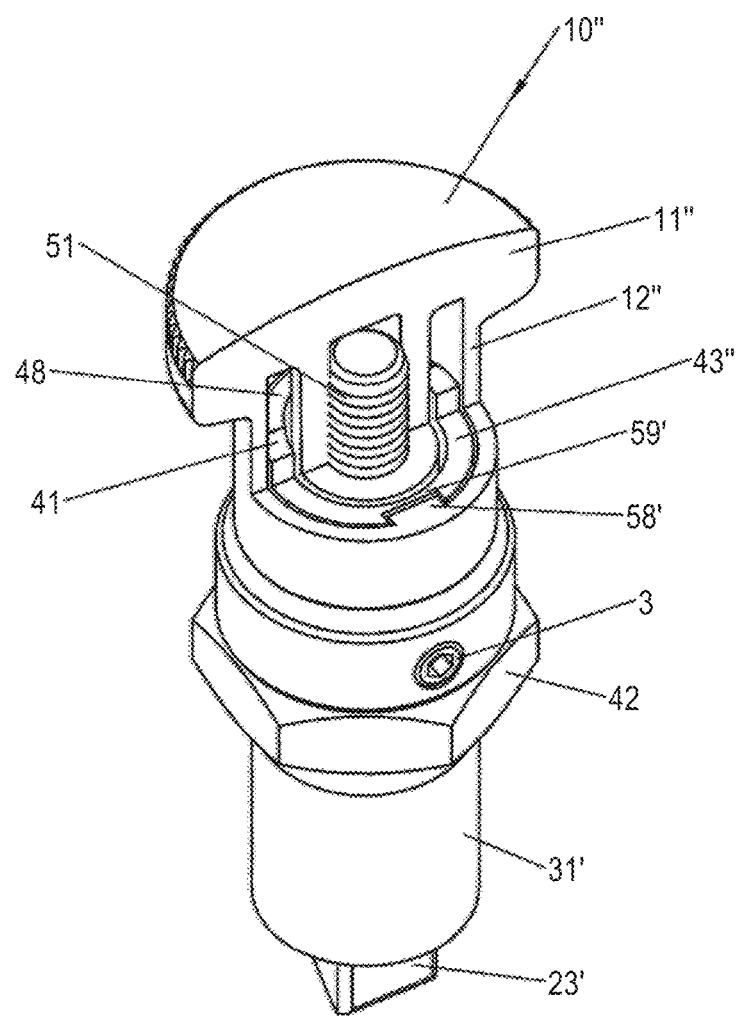
FIG. 16: shows a perspective view of a locking bolt with partially cut-away actuator head according to a fourth embodiment.

FIG. 16 shows a further embodiment example of the locking bolt, wherein the sleeve section 43" has an approximately rectangular and radially outwardly open recess 59' introduced longitudinally in the outer wall. Inside the sleeve 12" is a locking projection 58' engaging the recess 59' and having a shape complementary to the recess 59'. In the example according to FIG. 16, the locking projection 58 has a rectangular shape and is retracted into the associated recess 59'.

Figure 17:
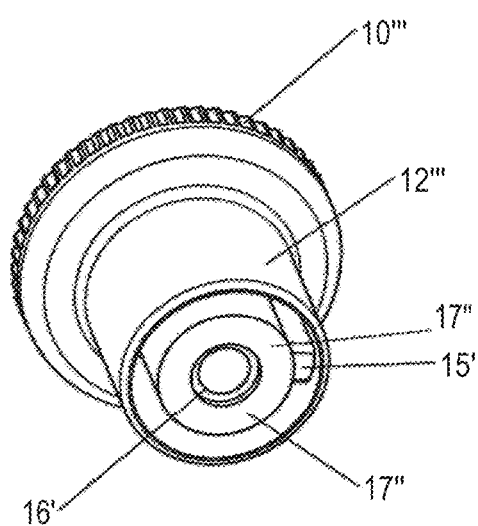
FIG. 17: shows a perspective view of an actuator head according to a fifth embodiment.

FIG. 17 shows another embodiment example of an actuator knob 10''', wherein the actuator knob 10''' is characterized by a locking projection 15' that engages a recess in a sleeve section not shown. The locking projection 15' extends radially between the inner surface of the sleeve 12''' and the mounting sleeve 17". The complementary recess of the sleeve section is formed by the slot penetrating the cylindrical sleeve section in the longitudinal direction.

Figure 18:
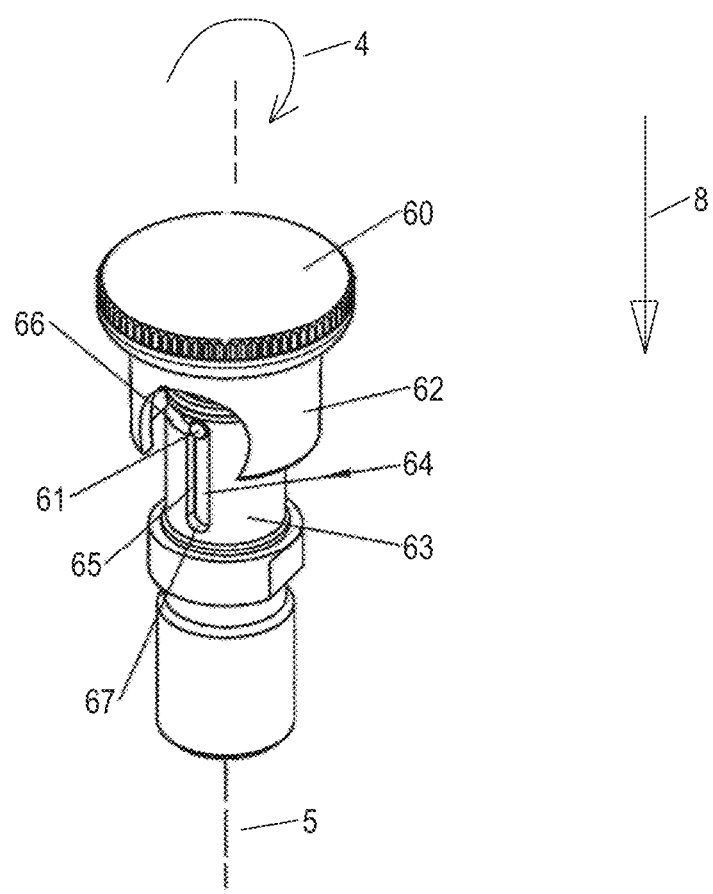
FIG. 18: shows a perspective view of a locking bolt with partially cut-away actuator head according to a sixth embodiment.

FIG. 18 shows another embodiment example of an actuator knob 60, in which the locking projection 61 extends in the radial direction between the inner surface of the sleeve 62 and the mounting sleeve. For simplicity, a circular section has been drawn in the drawing in the envelope surface of the sleeve 62 to make the locking projection 61 visible. The locking projection 61 is pin-shaped and engages a recess formed by a slotted guide 64 in the sleeve section 63. The slotted guide 64 is composed of a longitudinally extending slotted gate 65 and a slotted gate 66 extending above, in the direction of the head of the actuator knob 60, wherein the slotted gate 66 is introduced into the sleeve section 63 offset by about 90° relative to the slotted gate 65. When the locking projection 61 engages in the slotted gate 66, the actuator 60 can only be rotated about the center axis 5. If the locking projection 61 now reaches the slotted gate 65, the locking projection 61 retracts into the slotted gate 65 in arrow direction 8 and thus enables movement of the actuator head 60 along the center axis 5. Rotation is thus no longer possible. The movement of the locking projection 61 within the slotted gate 65 thus directly influences the adjustment position of the adjusting pin, which is not shown. Thus, the locking projection 61 retracted into the slotted gate 66 determines the neutral position of the locking bolt and only when the locking projection 61 has passed through the complete slotted gate 65 in arrow direction 8 and has reached the end portion 67 of the slotted gate 65, is the adjusting pin in the locked position.

Figure 19:
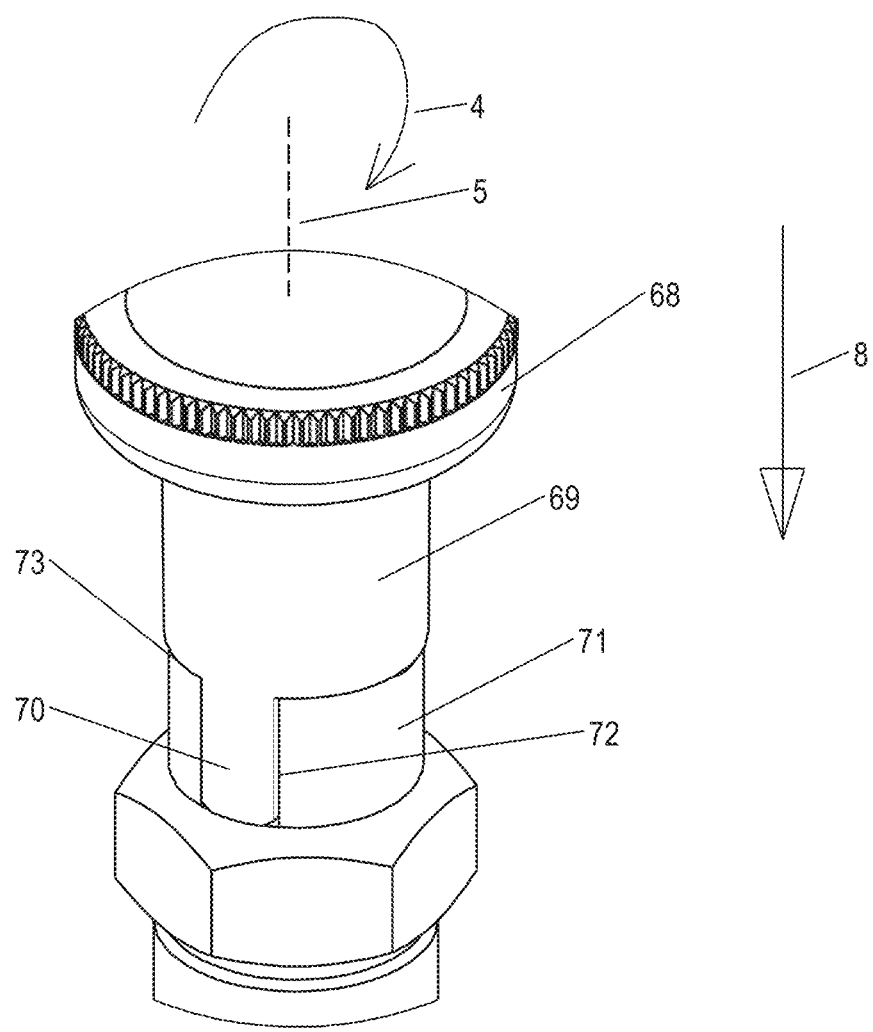
FIG. 19: shows a perspective view of a locking bolt with actuator head according to a seventh embodiment.

FIG. 19 shows another embodiment example of a locking bolt, wherein the actuator knob 68 has a cylindrical sleeve 69 with a locking projection 70. The locking projection 70 forms a longitudinally extending extension of the sleeve 69 and additionally extends radially inward. To accommodate the radially inwardly extending part of the locking projection 70, the sleeve section 71 has a complementary recess 72. If the actuator knob 68 is now pulled in the direction opposite the arrow direction 8, so that the locking projection 70 is disengaged from the recess 72, the actuator knob 68 can be rotated in arrow direction 4 about the center axis 5 and rests on the end face 73 of the sleeve section 71. The seating of the locking projection 70 on the end face 73 thereby forms the neutral position of the locking bolt, whereas a locking projection fully retracted into the recess 72 in arrow direction 8 defines the locked position of the locking bolt. This invention is not exclusively feasible with a closed knob; open variants are also quite possible, as shown in FIG. 19. The actuator knob can also have a shape different from that described here and, for example, be designed as a lever arm.

Drawing Legend

1. Locking bolt
2. Locking end
3. Grub screw
4. Arrow direction
5. Center axis
6. Axial compression spring 6'
7. Circlip
8. Arrow direction
9. Screw
10. Actuator knob 10'
11. Head 11'
12. Sleeve 12'
13. Receiving space 13'
14. End face (of 12)
15. Locking projection, 15'
16. Feed-through
17. Mounting sleeve 17'
18. Slot
19. Inner profile
20. Adjusting pin 20'
21. Beveled approach edge 21'
22. Actuating end 22'
23. Locking pin 23'
24. Marking
25. Ring shoulder
26. Guide section 26'
27. Circlip groove
28. Collar
29. Thread
30. Guide sleeve
31. External thread
32. External hexagonal profile
33. Sleeve section
34. Guide bore 34'
35. End stop
36. Bore section 36'
37. Interior space 37'
38. End face
39. Recess 39'
40. Guide sleeve
41. Locking groove
42. External hexagonal profile
43. Sleeve section
44. Tapped hole
45. Plug-in sleeve
46. Assembly area
47. End stop
48. End face
49. Recess
50. Knurling
51. Tooth-profiled area
52. Ring groove
53. End stop
54. Receiving sleeve
55. Stop
57. Mounting sleeve
58. Locking projection
59. Recess
60. Actuator knob
61. Locking projection
62. Sleeve
63. Sleeve section
64. Slotted guide
65. Slotted gate
66. Slotted gate
67. End portion
68. Actuator knob
69. Sleeve
70. Locking projection
71. Sleeve section
72. Recess
73. End face

The invention claimed is:

1. A spring-loaded locking bolt comprising:
a guide sleeve which is screwed into an associated bore in a machine or furniture part, the guide sleeve having a sleeve section,
an actuator knob,
an adjusting pin which is movably mounted axially in the guide sleeve and which is configured to be brought into at least two locking positions in the guide sleeve, and which can be adjusted from a locked position protruding axially out of the guide sleeve against the actuating force of an axial compression spring into a retracted neutral position which does not protrude axially from the guide sleeve, and which has a tip-side locking end and an oppositely arranged actuating end in connection with the actuator knob,
wherein the actuator knob has an outer sleeve with which the actuator knob is movably mounted axially on the sleeve section of the guide sleeve,
wherein the actuator knob comprises at least one internal locking projection which, in the locked position, engages in a locking manner in a corresponding recess in a side wall of the sleeve section of the guide sleeve,
wherein the actuator knob is engaged under spring tension and fixed in a rotationally fixed manner with respect to an axial rotation about a center axis of the locking bolt, and in a neutral position, a fixed position of the at least one internal locking projection which is blocked against rotation is cancelled and the actuator knob is rotatable about the center axis, wherein the actuator knob has an inner mounting sleeve which extends in the axial direction at a radial distance from the outer sleeve, and in which mounting sleeve the actuating end is at least partially received, wherein the mounting sleeve is connected to a feed-through extending through the head of the actuator knob, through which feed-through a screw is guided which engages in a thread extending in the longitudinal direction of the actuating end for axial adjustment of the spring-preloaded adjusting pin, wherein the mounting sleeve has an inner profile corresponding to the outer profile of the actuating end, and wherein the side wall of the mounting sleeve has slots running in the axial direction.

2. The locking bolt according to claim 1, wherein the at least one internal locking projection is arranged at an inner circumference of the outer sleeve and extends in radial and axial direction.

3. The locking bolt according to claim 1, wherein the at least one internal locking projection is seated on an end face of the sleeve section when in the neutral position due to operative spring tension and is configured to be brought into the at least two locking positions in the guide sleeve.

4. The locking bolt according to claim 1, wherein the end face has at least one locking groove for receiving the locking projection.

5. The locking bolt according to claim 1, wherein the adjusting pin has a locking pin at the tip-side locking end, a beveled approach edge disposed at an end of the tip-side locking end, and a guide section which adjoins the locking pin in a direction of the actuating end and which radially reduces in diameter, which is surrounded at least in sections by the axial compression spring and opens into the actuating end, which can be brought into axially fixed engagement with the actuator knob.

6. The locking bolt according to claim 5, wherein the guide sleeve has an axial guide bore through which the adjusting pin is guided and which is open in the direction of the tip-side locking end and which has a bore section in the direction of the actuating end which radially narrows the guide bore, and the guide bore once again enlarges radially above the bore section and forms an interior space within the sleeve section which is open in the direction of the actuating end.

7. The locking bolt according to claim 1, wherein the axial compression spring is clamped between a ring shoulder of the adjusting pin, which is radially enlarged relative to the guide section, and an end stop between the bore section and the guide bore of the guide sleeve.

8. A spring-loaded locking bolt comprising:
a guide sleeve which is screwed into an associated bore in a machine or furniture part, the guide sleeve having a sleeve section,
an actuator knob,
an adjusting pin which is movably mounted axially in the guide sleeve and which is configured to be brought into at least two locking positions in the guide sleeve, and which can be adjusted from a locked position protruding axially out of the guide sleeve against the actuating force of an axial compression spring into a retracted neutral position which does not protrude axially from the guide sleeve, and which has a tip-side locking end and an oppositely arranged actuating end in connection with the actuator knob, wherein the actuator knob has an outer sleeve with which the actuator knob is movably mounted axially on the sleeve section of the guide sleeve, wherein the actuator knob comprises at least one internal locking projection which, in the locked position, engages in a locking manner in a corresponding recess in a side wall of the sleeve section of the guide sleeve, wherein the actuator knob is engaged under spring tension and fixed in a rotationally fixed manner with respect to an axial rotation about a center axis of the locking bolt, and in a neutral position, a fixed position of the at least one internal locking projection which is blocked against rotation is cancelled and the actuator knob is rotatable about the center axis, and wherein the guide sleeve is at least divided into two parts and consists of a plug-in sleeve and a rotatable receiving sleeve plugged onto the plug-in sleeve.

9. The locking bolt according to claim 8, wherein the plug-in sleeve has a ring groove in which a grub screw protruding inwardly from the receiving sleeve engages and positionally secures the two sleeves against each other.

10. The locking bolt according to claim 8, wherein the fastening end of the adjusting pin has a profiling for a rotationally fixed and frictional connection to the actuator knob.

11. A spring-loaded locking bolt comprising:
a guide sleeve which is screwed into an associated bore in a machine or furniture part, the guide sleeve having a sleeve section,
an actuator knob,
an adjusting pin which is movably mounted axially in the guide sleeve and which is configured to be brought into at least two locking positions in the guide sleeve, and which can be adjusted from a locked position protruding axially out of the guide sleeve against the actuating force of an axial compression spring into a retracted neutral position which does not protrude axially from the guide sleeve, and which has a tip-side locking end and an oppositely arranged actuating end in connection with the actuator knob, wherein the actuator knob has an outer sleeve with which the actuator knob is movably mounted axially on the sleeve section of the guide sleeve, wherein the actuator knob comprises at least one internal locking projection which, in the locked position, engages in a locking manner in a corresponding recess in a side wall of the sleeve section of the guide sleeve, wherein the actuator knob is engaged under spring tension and fixed in a rotationally fixed manner with respect to an axial rotation about a center axis of the locking bolt, and in a neutral position, a fixed position of the at least one internal locking projection which is blocked against rotation is cancelled and the actuator knob is rotatable about the center axis, and wherein the bore section, which is radially reduced relative to the guide bore, forms an end stop in the direction of the actuating end, on which a circlip, which is at least partially introduced into a circlip groove of the guide section, rests when the thread is decoupled from the screw and the adjusting pin is moved axially.

* * * * *